(12) United States Patent
Yakubov et al.

(10) Patent No.: US 9,162,391 B2
(45) Date of Patent: *Oct. 20, 2015

(54) LARGE SHELLS MANUFACTURING APPARATUS

(71) Applicant: Massivit 3D Printing Technologies LTD, Lod (IL)

(72) Inventors: Igor Yakubov, Herzliya (IL); Moshe Uzan, Bet Shemesh (IL)

(73) Assignee: Massivit 3D Printing Technologies LTD., Lod (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/608,217

(22) Filed: Jan. 29, 2015

(65) Prior Publication Data

US 2015/0217516 A1 Aug. 6, 2015

Related U.S. Application Data

(63) Continuation of application No. 14/265,586, filed on Apr. 30, 2014, now Pat. No. 8,974,213.

(60) Provisional application No. 61/872,764, filed on Sep. 2, 2013.

(51) Int. Cl.
*B29C 67/00* (2006.01)
*B29L 9/00* (2006.01)
*B29L 22/00* (2006.01)

(52) U.S. Cl.
CPC ......... *B29C 67/0055* (2013.01); *B29C 67/0051* (2013.01); *B29C 67/0066* (2013.01); *B29C 67/0081* (2013.01); *B29C 67/0092* (2013.01); *B29L 2009/00* (2013.01); *B29L 2022/00* (2013.01)

(58) Field of Classification Search
CPC ............ B29C 67/0051; B29C 67/0055; B29C 67/0059; B29C 67/0066; B29C 67/0081; B29C 67/0088; B29C 67/007; B29C 67/0092
USPC ......... 264/113, 308, 401, 405, 497, 482, 241; 425/174.4, 375
See application file for complete search history.

(56) References Cited

U.S. PATENT DOCUMENTS

| 6,270,335 | B2 * | 8/2001 | Leyden et al. | 425/375 |
| 6,936,212 | B1 * | 8/2005 | Crawford | 264/308 |
| 8,974,213 | B1 * | 3/2015 | Yakubov et al. | 425/375 |
| 2013/0053995 | A1 * | 2/2013 | Hashimoto et al. | 700/97 |
| 2014/0162033 | A1 * | 6/2014 | Giller | 428/207 |
| 2014/0268604 | A1 * | 9/2014 | Wicker et al. | 361/760 |

* cited by examiner

*Primary Examiner* — Alison Hindenlang
*Assistant Examiner* — Lawrence D Hohenbrink, Jr.
(74) *Attorney, Agent, or Firm* — Manelli Selter PLLC; Edward J. Stemberger

(57) ABSTRACT

The current document discloses an apparatus and method that support manufacture of large 3D hollow objects or shells with thin walls including curved surfaces with high and low curvature change ratio and alleviate or significantly reduce the need for support structures. Further to this, introduction of support structures becomes a function of the curved surface curvature change ratio.

9 Claims, 14 Drawing Sheets

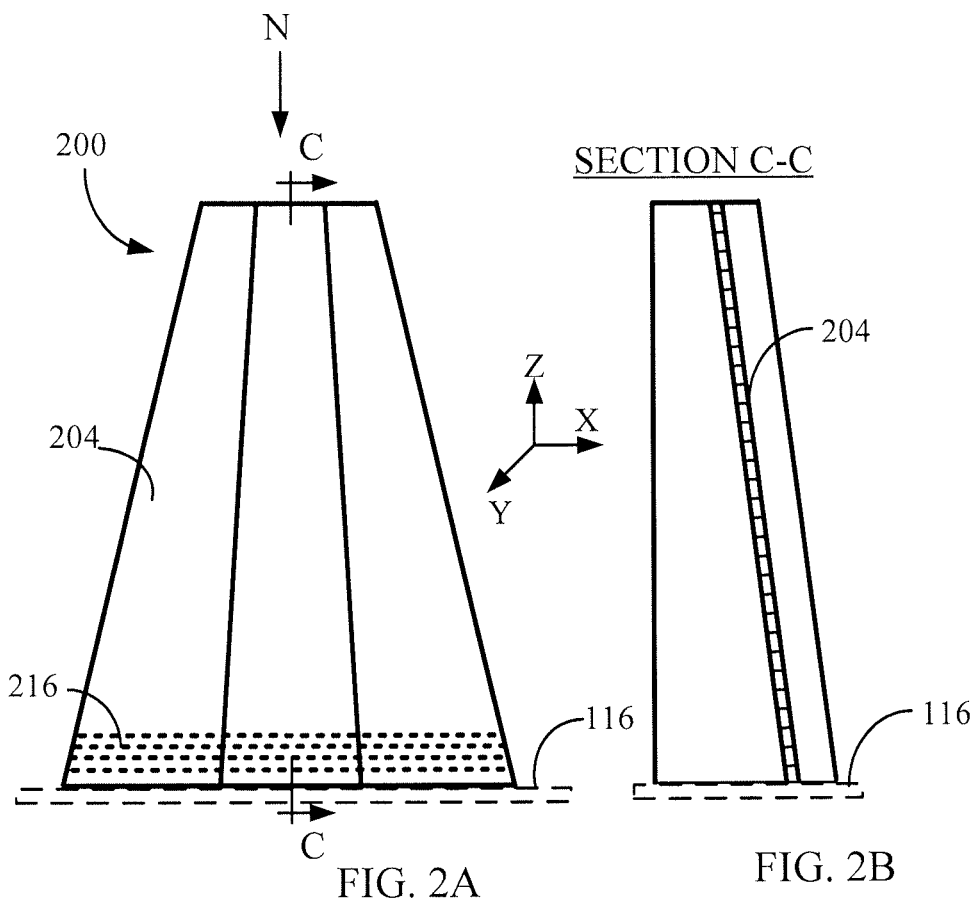
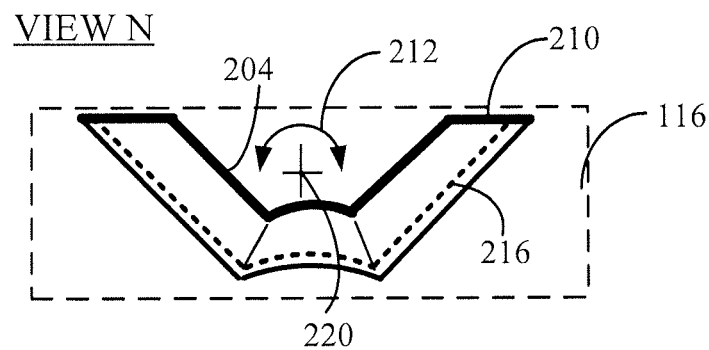
FIG. 2A
FIG. 2B
FIG. 2C

LARGE SHELLS MANUFACTURING APPARATUS

BACKGROUND

Manufacture of three dimensional (3D) models or objects is an additive manufacturing process by means of which a computer generated 3D model is converted into a physical object. The process, sometimes termed stereo-lithography, involves generation of a plurality of material layers of different or identical shape that are laid down or deposited on top (or bottom) of each of the preceding layer until the amount of layers results in a desired physical object.

The material from which the layers of the physical object are generated could come in liquid, paste, powder, gel and other aggregate state. The materials are dispensed by a plurality of methods including inkjet printing, extrusion and sintering. Conversion of such materials into a solid form is typically performed by suitable actinic radiation and/or heat.

Manufacturing of 3D models and objects spans over a large range of applications. This includes prototype manufacture, small runs of different products manufacture, decorations, sculptures, architectural models, and other physical objects.

Recently, manufacture of relatively large size physical objects and models has become popular. Large size statues, animal figures, signage letter, and decorations are manufactured and used in different carnivals, playgrounds, and supermarkets. Where the manufacturing technology allows, some of these physical objects are manufactured as a single piece at 1:1 scale and some are coming in parts assembled into the physical object at the installation site. Manufacturing of such large objects consumes significant amount of relatively expensive materials and techniques to reduce the amount of the expensive materials by including in the manufactured object different support or reinforcement structures have been developed. Methods for manufacture of such supports or reinforcement structures are described for example, in U.S. Pat. Nos. 5,595,703; 6,797,351; 8,285,411; and US Patent Application Publication 2010/0042241.

Introduction of support or reinforcement structures allows small savings on material costs since some of the objects are manufactured as shells or hollow structures. However, large shells could warp, or otherwise deform even in course of their manufacture and multiple support structures integral with the shells or constructed at the installation sites are required. Since the objects manufactured as shells have their inner space hollow or empty, the support structures are mounted or manufactured to be located in these hollow spaces. Although for some shells, the support structures located in the hollow inner space are not sufficient and frequently they become augmented with outer support structure that in addition to cost adversely affect the visual appearance of the object. These support structures significantly increase the object production time, consume costly material, and require additional labor to install them and to remove some of the unnecessary material.

GLOSSARY

"Shell"—as used in the current disclosure the term shell means a structure or a physical object, usually hollow inside, the wall thickness of which is small compared to its other dimensions. The shell structure could be a curved structure with a curvature of second or higher power; although in some examples it could have certain flatness or flat segments.

"Curvature"—as used in the current disclosure the term curvature is the amount by which a geometric object deviates from being flat, or straight in the case of a line.

"Curvature change ratio"—as used in the current disclosure the term curvature change ratio means the ratio of the change in the angle or slope of a line tangent that moves over a given segment of a curve or arc. First derivative defines a slope of the line tangent to the curve.

"3D physical object shell material" or "shell material"—as used in the current disclosure means the material from which the shell is manufactured.

"Support material"—as used in the current disclosure the term support material means material from which the shell material support is made.

"Frequency of support material dispensing"—as used in the current disclosure the term frequency of support material dispensing means the frequency of support material dispensing as a function of the curvature change ratio.

"Aspect ratio"—as used in the current disclosure the term aspect ratio means a ratio of the height of the generated feature to the thickness of the generated feature.

"Horizontal plane"—as used in the current disclosure horizontal plane means a plane normal to the gravitational force. Vertical plane is a plane perpendicular to the horizontal plane.

"Conventional support"—as used in the current disclosure the term conventional support means support structures known at least from the references listed.

The terms "3D hollow object" and "shell" are used interchangeably in the current disclosure and have the same meaning.

SUMMARY

Disclosed is an apparatus for additive manufacturing of large 3D hollow objects, also termed shells. Such objects typically have thin walls. The apparatus includes a 3D hollow object material deposition module configured to deposit a portion of material forming at least a layer of a 3D object shell wall, a 3D object material solidifying module configured to solidify at least the portion of material forming the layer of the 3D object shell wall; and a support material dispensing module configured to dispense a support material across a cross section of the 3D object.

The 3D hollow object material deposition module of the apparatus could be an inkjet module, an extrusion module, a material sintering module, or any other known material deposition module. The 3D hollow object material solidifying module could be a module configured to provide ultraviolet radiation, infrared radiation, microwave radiation, and heat.

The support material is dispensed across the cross section of the 3D hollow object as a function of at least one of 3D hollow object or shell wall characteristics. The characteristics could include the angle of the 3D hollow object wall with a horizontal surface or wall curvature change ratio. The support material could be one of a group of materials consisting of a metal grid, a plastic grid, a fabric grid, a grid made of material dissolvable in material of which the 3D hollow object is made, and a combination of all of the above. Upon completion of the 3D hollow object manufacture, the support material becomes embedded into the 3D hollow object material.

The support material dispensing module dispenses the support material more frequent at segments of the 3D hollow object walls with flat and tilted surface that are at large tilt angles with respect to horizontal surfaces. For curved walls the frequency of the support material dispensing is a function of curvature change ratio or the angle of the tangent to the curved surface with the horizontal surface, for example, the support material dispensing module dispenses the support material more frequent at segments of the 3D hollow object proximate to the curve maxima, minima or inflection points or at segments with large angles between the tangent to the curved surface with the horizontal surface.

The method of manufacture of 3D hollow objects or shells supports a combined support material dispensing process with use of conventional support structures of 3D hollow object or shell. Conventional type support structures could be implemented concurrently with introduction of a more rigid support material, for example, a metal grid or net could be dispensed instead of a plastic grid. Support material could be dispensed across the whole cross section of the shell including the hollow spaces to become included in the conventional support structures. This resin reinforces the conventional support structures that now could consume essentially less of expensive 3D object material than support structures without support material would consume. Conventional supports could be introduced at a different frequency or distance between them. The curvature change ratio or the angle of the tangent to the curved surface or flat segments or the shell with the horizontal surfaces would define the frequency of conventional support structures. The conventional support structures could be perpendicular to the support material layers or at an angle to the support material or the 3D hollow object or shell. Different types of conventional supports could be used in a combination with different support materials.

BRIEF DESCRIPTION OF THE DRAWINGS

FIG. 2A is a schematic illustration of a large 3D hollow objector shell, according to an example;

FIG. 2B is a sectional view taken along the line C-C in FIG. 2A;

FIG. 2C is a view taken along the line N in FIG. 2A;

DETAILED DESCRIPTION OF EXEMPLARY EMBODIMENTS

In some of the manufacturing applications, where large size 3D objects or models are produced by additive manufacturing processes, the external appearance or segments of the object exposed to an observer is more important than the inner segments or volumes of the 3D hollow object or shell. Such 3D objects are usually manufactured by producing relatively thin shells of for example, shells with walls having 1 mm to 5 mm or even 8 mm thickness. The size of the manufactured 3D object could be significant for example, between 100 mm by 100 mm; 1000 mm by 1000 mm or even 10000 mm by 10000 mm. In addition, the 3D object could include substantial segments with curved surfaces and walls. At certain size of the wall segment, the wall segment tilt and curvature change ratio the shell walls could become not stable and even collapse. Currently, to avoid collapse of the flat tilted and horizontal walls as well as curved walls, such 3D objects or models are manufactured by providing numerous supports structures made of the same material as the 3D object is made. The support structures are typically located in the inner segments of the 3D object. Such support structures are not visible to the observer and do not affect visual perception of the 3D object.

Currently, all systems manufacturing 3D objects operate in raster scanning mode. These support structures significantly increase the 3D hollow object production time, consume costly material, increase final 3D object weight and require additional labor to remove some of the unnecessary material. In some instances, the inner space of such objects could be filled in with porous material. This reduces the weight of the 3D object, but requires significant, typically manual, procedures.

The current document discloses an apparatus and method that support manufacture of large 3D hollow objects or shells with thin walls including curved walls and surfaces with high and low curvature change ratio and alleviate or significantly reduce the need for support structures. Further to this, introduction of support structures becomes a function of the curved wall segment curvature change ratio or the angle between a flat wall and a horizontal surface.

Figure 1:
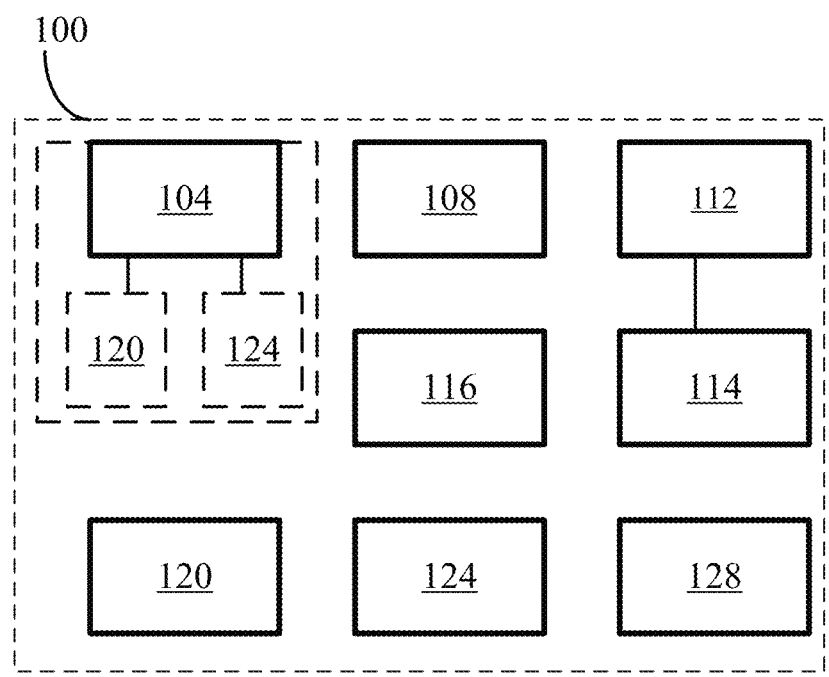
FIG. 1 is a schematic illustration of an apparatus for additive manufacturing of large 3D hollow objects or shells, according to an example.

Reference is made to FIG. 1 which is a schematic illustration of an apparatus for additive manufacturing of 3D objects such as hollow objects with thin walls or shells, according to an example. Apparatus 100 includes a 3D hollow object or shell material deposition module 104 configured to deposit a portion of material forming a segment or a layer 216 (FIG. 2A) of a 3D hollow object 200 or shell wall 204, a 3D object material solidifying module 108 configured to solidify at least the portion of material deposited and forming a segment or a layer 216 of the 3D hollow object or shell 204, and a support material dispensing module 112 configured to dispense a support material across the cross section of the 3D hollow object. Support material dispensing module 112 dispenses the support material, which could be a plastic grid, a metal grid or fabric net, across the whole cross section of the 3D hollow object including the hollow spaces of the 3D object or shell. Support material dispensing module 112 could be configured to dispense a number of different support materials. Alternatively, apparatus 100 could include a number of support material dispensing modules 112-1, 112-2 and so on, with each module configured to dispense different support material. The support material dispensing module 112 could also include a stretching mechanism 114 configured if necessary to stretch and tension each dispensed support material layer to provide the desired level of tension and stability to the 3D object or shell. Generally, the support material is substantially less expensive than the 3D object material used to form a segment or a layer 216 of the 3D objector shell 204.

Apparatus 100 could also include a computer 128 configured to receive the 3D hollow object design information from a CAD system, adapt the 3D hollow object design information to a particular manufacturing process, and control the apparatus for additive manufacturing of 3D hollow objects or shells.

The 3D hollow object 200 and in particular shell 204 (FIGS. 2A-2C) of the 3D hollow object could be manufactured by employing material deposition module 104 to deposit a plurality of 3D object material layers of different or identical shape. The layers are laid down or deposited on top (or bottom) of each of the preceding layer until the amount of layers results in a desired 3D object. In one example, the 3D object to be manufactured could be located on a support or table 116 configured to move in three directions. The direction could be the know X, Y, and Z axes. Alternatively, instead of moving support table 116 in the three directions, material deposition module 104 could be configured to move in the three directions over the support table 116. In another example, the movement in the three directions could be split between the support table 116 and material deposition module 104.

The 3D physical object material deposition module 104 could employ almost any know material deposition technology. It could be an inkjet module 120, a material extrusion module 124, a material sintering module, and other modules as well as a combination of different material deposition modules. Further to this, each material deposition module 104 could include a plurality of ink ejecting printheads, a plurality of material extrusion nozzles, and a combination of the above. Additionally, the plurality of ink ejecting printheads or the plurality of material extrusion nozzles could be configured to support simultaneous manufacturing of different segments of the 3D hollow object. The plurality of ink ejecting printheads or the plurality of material extrusion nozzles could also be configured to deposit different materials and materials of different color.

The existing 3D manufacturing systems produce 3D objects and shells with their support structures in raster scanning format. Such type of scanning results in long manufacturing times. The present system could form a 3D hollow object or shell 204 in a vector type of movement, significantly reducing the manufacturing time. In some examples, support table 116 with located on it 3D hollow object 200 could be configured to rotate as shown by arrows 212 around an axis 220 (FIG. 2C), which could be the Z axis or central axis of the support including rotation about an offset axis when the support is moved in X or Y direction. However, as it will be shown below it is more convenient and simple to move the solidification radiation source or a scanning laser beam.

As shown in FIG. 2A, apparatus 100 forms 3D hollow object 200 or only the shell 204 by depositing a plurality of 3D physical object material layers 216. The layers could be of different or identical shape and they are laid down or deposited on top or bottom of each of the preceding layer until the amount of layers results in a desired 3D hollow object. The material from which the layers of the 3D hollow object are laid down could come in liquid, paste, powder, gel and other aggregate state. The material from which the layers 216 of the 3D hollow object 200 are laid down also could come in a plurality of colors. The colors could be colors such as Gray, Orange, Blue, White, Green, Black, and others. Thick line 210 schematically illustrates the thickness of the object 200 wall.

As it was disclosed above the material from which the layers of the 3D hollow object are laid down could come in a variety of aggregate states. Physical object material solidifying module 108 is configured to solidify or convert these materials into a solid aggregate state. The solidifying module 108 (FIG. 1) typically solidifies the 3D hollow object material layers 212 by material solidifying radiation or simply radiation. In some examples, the 3D hollow object material could include deposition of a number of different materials that solidify by a chemical reaction between them, for example, epoxy like materials. The radiation could be an ultraviolet radiation, infrared radiation, laser radiation, microwave radiation, and heat. Material solidifying module 108 could include a source of radiation emitting one type of radiation or a number of radiation sources emitting different types of 3D object material solidifying radiation.

The 3D object material solidifying radiation could be applied in a flood radiation mode where all of the 3D object material is illuminated/irradiated and solidified, or through a digital mask such as a DLP® modulator or switch commercially available from Texas Instruments, Inc., Dallas Tex. 75201 U.S.A., or in a laser scanning mode. The digital mask (DLP) and laser scanning mode of solidifying radiation application support selective solidification of desired segments of a deposited 3D hollow object material.

Regardless of how and where the successive layers 212 of 3D hollow object material are laid down on a the top or bottom of the previous layer, when the aspect ratio of the manufactured shell with flat vertical or horizontal walls reaches certain proportions the shell tends to collapse. It was experimentally determined that dependent on the type of material deposited, at aspect ratio of 1:10 to 1:100, the shell becomes not stable and as the material deposition continues, the shell tends to collapse. According to an example, the support material dispensing module 112 (FIG. 1) dispenses a support material across a cross section of the 3D hollow object or shell, including hollow spaces, when the 3D object shell vertical walls aspect ratio exceeds at least 1:15 or 1:20. Depending on the aspect ratio of the 3D hollow object walls, material of the walls, cost considerations, and other parameters computer 128 could be configured to adapt operation of support material dispensing module 112 to operate at different aspect ratios, for example at 1:15 or 1:50 or even 1:5. Computer 128 could also be configured, as it will be explained below, to adapt operation of support material dispensing module 112 to dispense support material at different frequency or a different support material a function of the shell wall angle with the horizontal plane. The support material could be such material as a metal grid, a plastic grid, a fabric grid, a grid made of material dissolvable in the 3D physical object material, and a combination of all of the above.

Figure 3A:
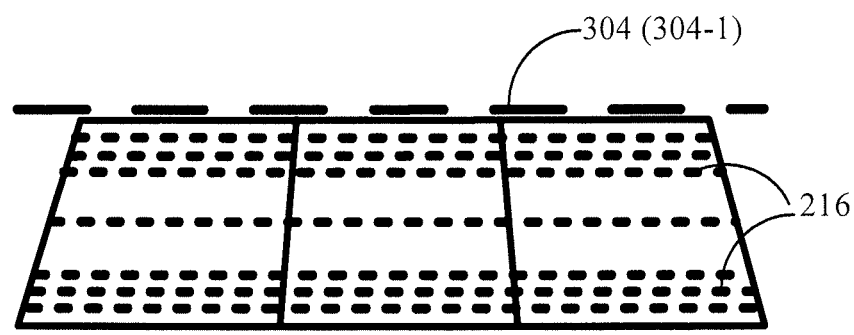
FIGS. 3A and 3B are schematic illustrations of a stage in a large 3D hollow object or shell manufacturing according to an example. The figure illustrates shell material deposition process including support material dispensing process.
Figure 3B:
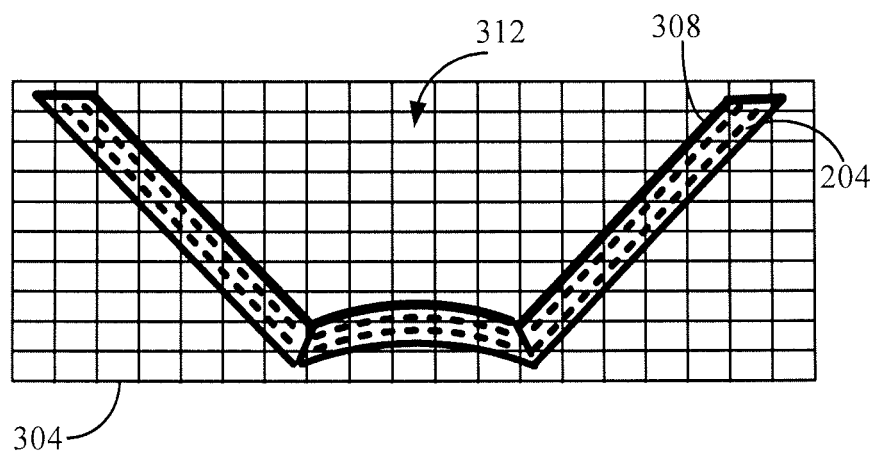

FIGS. 3A and 3B are schematic illustrations of a stage in a large 3D hollow object or shell manufacturing according to an example. The figure illustrates 3D hollow object material deposition process including support material dispensing process. The support material dispensing module 112 (FIG. 1) dispenses periodically the support material 304 (304-1) across a cross section 308 of the 3D hollow object 200 including the hollow or empty space 312. The support material could be one of a group of materials consisting of a metal grid, a plastic grid, a fabric grid, a grid made of material dissolvable in the 3D hollow object material, and a combination of all of the above. According to one example, the period between two successive support material dispenses is generally determined by the time required to deposit a portion of material sufficient to generate a stable segment of a 3D hollow object or shell. The period or frequency of support material dispensing could be set depending on the angle of the walls (tilt) with a horizontal surface, or the curvature change ratio, or on the aspect ratio of which exceeds for example, 1:10 or 1:50 or any other ratio dictated by the material used and other listed above parameters. In some examples, the frequency of support material dispensing could be set according to the requirements of the most critical wall to be manufactured, which could be a curved or tilted wall.

Figure 4A:
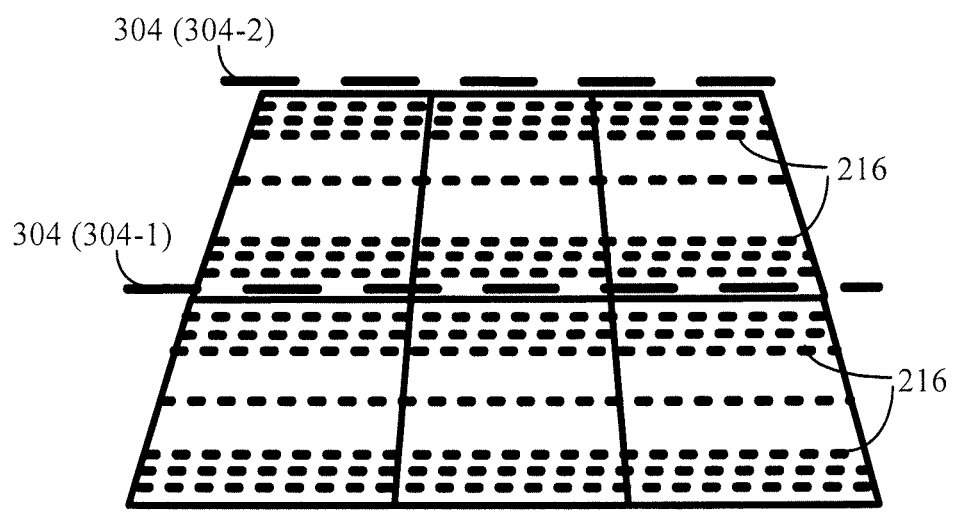
FIGS. 4A and 4B are schematic illustrations of a next stage in a large 3D hollow object or shell manufacturing process according to an example. The figure illustrates shell material deposition process including support material dispensing process.
Figure 4B:
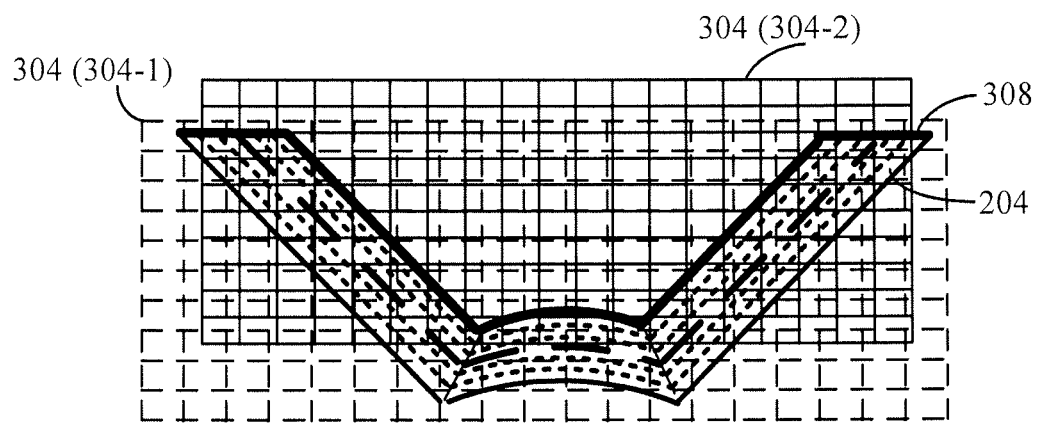
Figure 5A:
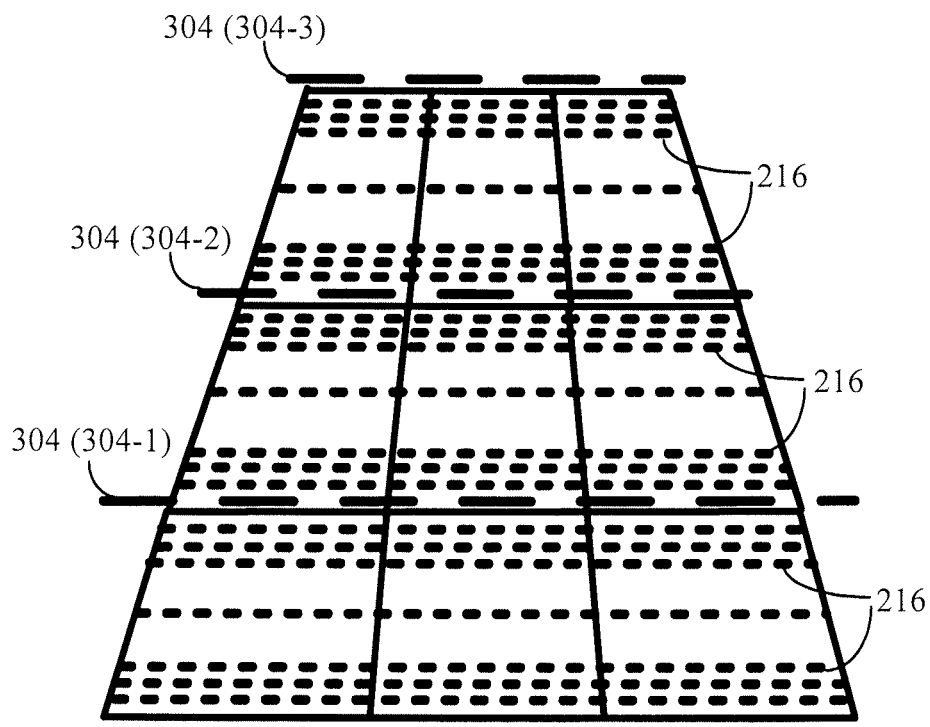
FIGS. 5A and 5B are schematic illustration of a further stage in a large 3D hollow object or shell manufacturing process according to an example. The figure illustrates shell material deposition process including support material dispensing process.
Figure 5B:
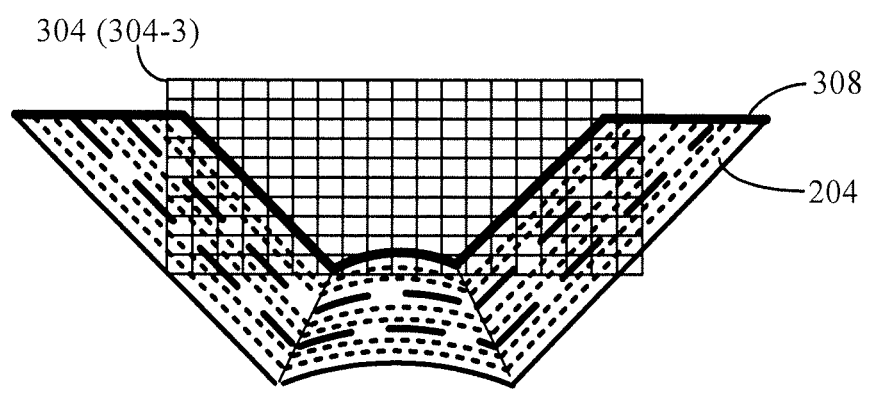

FIGS. 4A and 4B and FIGS. 5A and 5B illustrate progressive stages in the manufacture of a large 3D hollow object or shell material deposition process including support material dispensing process. FIGS. 4A and 4B illustrate the next stage in a large 3D hollow object or shell material 216 deposition process, where following deposition of a number of 3D hollow object or shell material layers 216 a layer of support material 304 (304-1, 304-2; 304-3) is dispensed. The process continues until the manufacture of the 3D physical object shell is completed. The type and size of the support material 304 could be adapted to the particular cross section size and strength.

According to another example the support material dispensing module 112 dispenses periodically the support material across a cross section of the 3D hollow object and the period between two successive support material dispenses is generally a function of the 3D hollow object shell curvature. The shell curvature is typically a second or higher power curvature. It could have curvature maxima and minima points as well as curvature inflection point or points. The support material dispensing module 112 at these points would dispense the support material at a higher frequency than at other segments of the shell. Upon completion of the shell or 3D hollow object manufacture, the excessive support material could be trimmed at least at the external surfaces of the shell.

Figure 6:
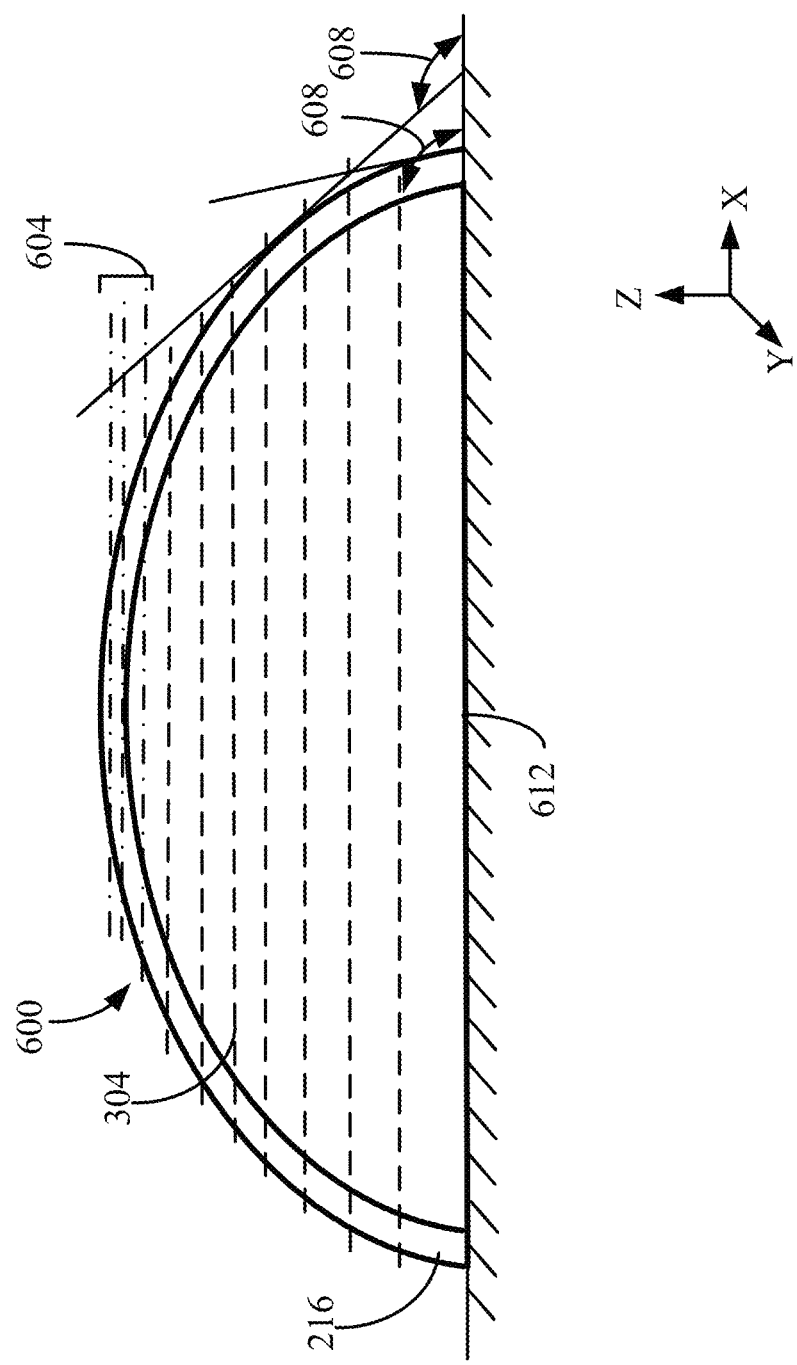
FIG. 6 is a schematic illustration of a support material dispensing process for an apparatus for additive manufacturing of large 3D hollow objects or shells, according to an example.

FIG. 6 is a schematic illustration of a support material dispensing process for an apparatus for additive manufacturing of a 3D hollow object or shell, according to an example. Shell 600, is half of an ellipsoid. Deposition process of shell material 216 is similar to the ones described above. Following deposition of a number of 3D physical object or shell 600 material 216 a layer of support material 304 is dispensed. Support material 304 could be a plastic grid. The frequency of the support material 304 dispensing increases (inversely proportional) as a function of the angle 608 between the 3D object shell and horizontal plane 612 or plane defined by X-Y axes. The larger the angle 608 becomes the more frequent support material 304 is dispensed. The stretching mechanism 114 of support material dispensing module 112 could also be configured to stretch and tension each dispensed support material layer to provide the desired level of tension and stability to the 3D object or shell.

According to one example, concurrently with the increase of the support material 304 dispensing frequency, support material 304, could be replaced by a more rigid support material, for example, a metal grid 604 could be dispensed instead of a plastic grid 304 or plastic grid of different strength and mesh could be dispensed. As it was indicated above, support material dispensing module 112 could be configured to dispense a number of different support materials. Alternatively, apparatus 100 (FIG. 1) could include a number of support material dispensing modules, with each module configured to dispense different support material.

Figure 7:
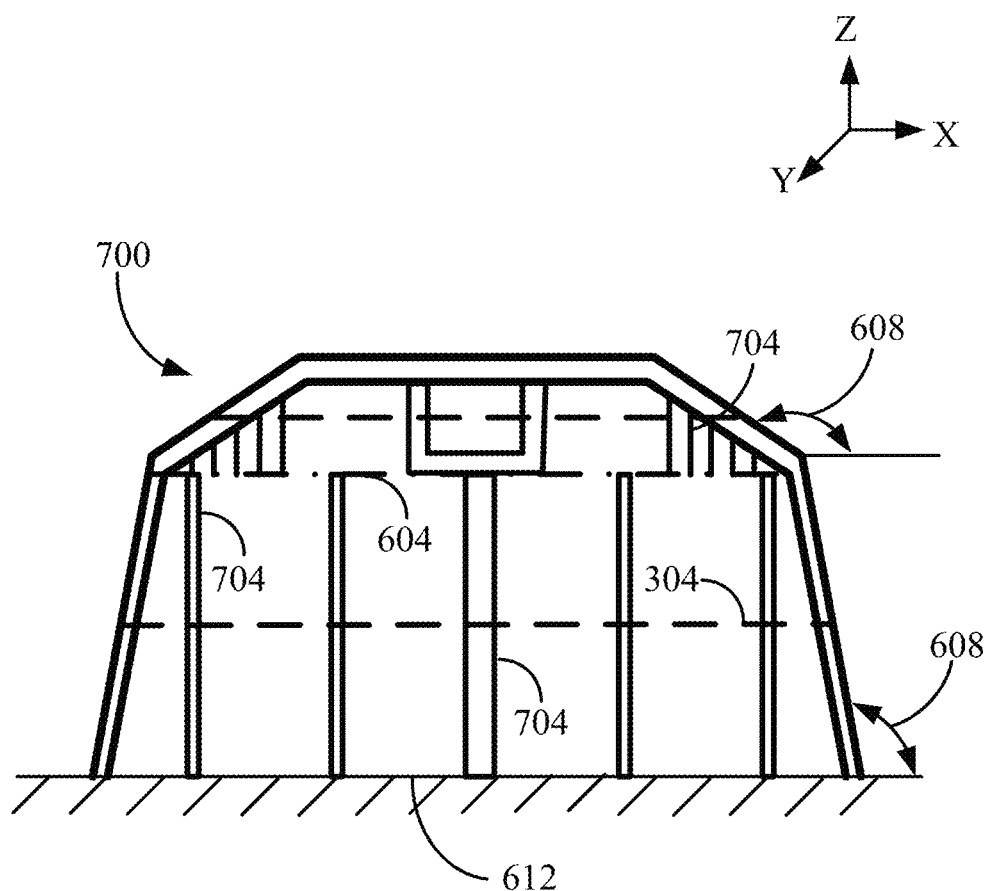
FIG. 7 is a schematic illustration of a combined support material dispensing process with use of conventional support structures for manufacture of large 3D hollow objects or shells, according to an example.

According to one example, and in particular at large angles 608 between the 3D object shell and horizontal plane 612 or plane defined by X-Y axes, support material 304 dispensing frequency could be increased, the level of support material stretching could be changed, or introduction of a more robust support material 604 replacing support material 304 could be implemented. According to another example, and in particular at large angles 608 between the 3D object shell and horizontal plane 612 or plane defined by X-Y axes, concurrently with the use of support material 304 or 604, a plurality of conventional support structures 704 (FIG. 7) could be implemented. FIG. 7 is a schematic illustration of a combined support material dispensing process with use of conventional support structures for manufacture of large 3D hollow objects or shells, according to an example. Conventional type support structures 704 could be implemented concurrently with introduction of a more rigid support material, for example, a metal grid 604 could be dispensed instead of a plastic grid 304. In addition the level of support material stretching could be varied. Properly dispensed and stretched support material provides a sufficient support basis for additional conventional support structures. Since the support material could be dispensed to become included or embedded in the conventional support structures 704 it enforces the conventional support structures 704. Reinforced conventional support structures 704 could consume essentially less of expensive 3D hollow object material than support structures without support material would consume. Upon completion of the shell or 3D hollow object manufacture, the excessive support material 304 or 604 could be trimmed at least at the external surfaces of the shell.

When 3D hollow object walls are at an angle (tilted) to a horizontal surface, the weight of the wall under influence of gravity could develop a force sufficient to distort and even destroy the wall. Depending on the angle at which a particular 3D hollow object wall is oriented to the horizontal plane computer 128 (FIG. 1) could be configured to adapt operation of support material dispensing module 112 to operate at different frequency for manufacture of 3D hollow object walls as a function of the wall angle 608 with the horizontal plane 612. For large angles, for example, 50 degrees to 80 degrees, of the wall with the horizontal plane, computer 128 could operate support material dispensing module 112 at a higher frequency or shorter time intervals than for large angles of the wall with the horizontal plane, for example 50 or 80 degrees or more. In addition the level of support material stretching could be varied. For all practical purposes the frequency of support material dispensing could be adapted to include different wall angles and thicknesses, wall size, wall materials, cost considerations and others.

The conventional support structures could be perpendicular to the shell walls or at an angle to the 3D hollow object or shell walls. Different types of conventional supports could be used in a combination with different support materials.

Figure 8:
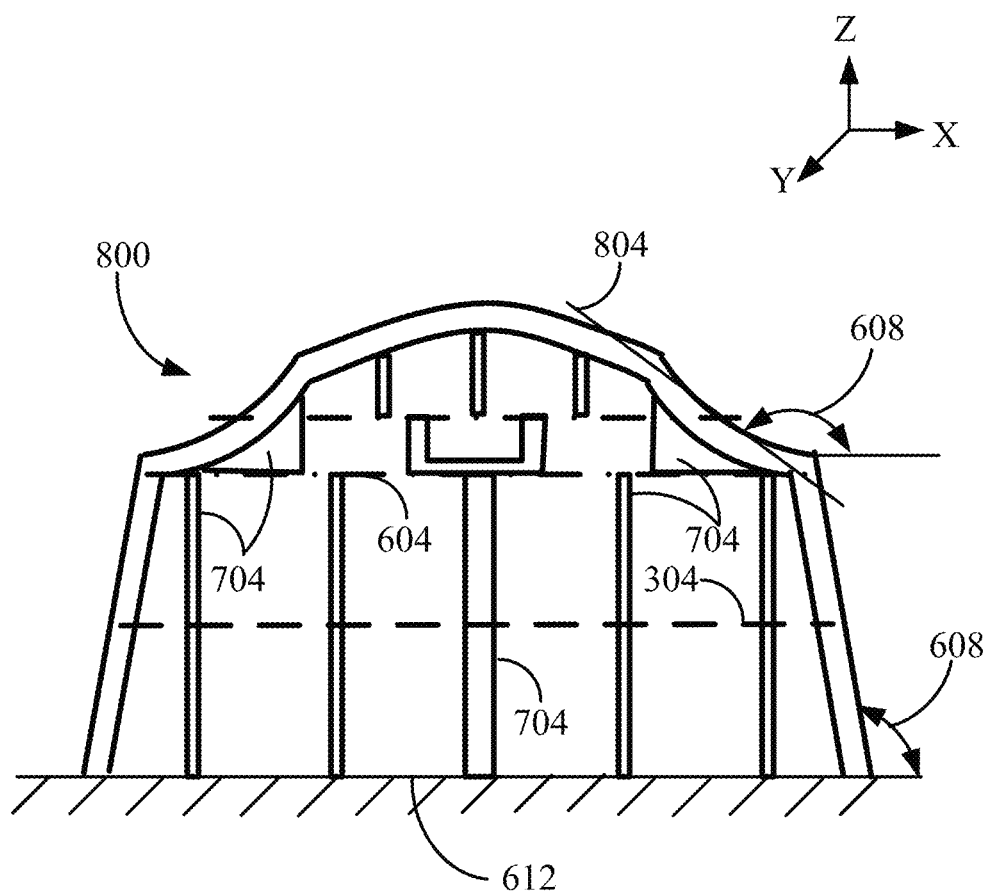
FIG. 8 is a schematic illustration of a combined support material dispensing process with use of conventional support structures of large 3D hollow objects or shells that include flat and curved wall segments.

Usually, 3D hollow objects 200 and 800, as shown in FIGS. 2 and 8 include a mix of plane and curved surfaces. Curved surfaces could be characterized by a curvature change ratio parameter or the change in the angle or slope of a line 804 tangent that moves over a given segment of the curved surface. Similar to the disclosed above considerations computer 128 (FIG. 1) could be configured to operate the support material dispensing module 112 to dispense a support material across a cross section of the 3D hollow object or shell as a function of curvature change ratio.

Computer 128 (FIG. 1) could also be configured to operate the support material dispensing module 112 to dispense a support material across a cross section of the 3D hollow object or shell and account for sudden changes in the weight to be supported. Such sudden changes in the weight could be caused by a snow fall or a rain.

Computer 128 could also be configured to optimize the combination (hybrid) between conventional support 704 and dispensed support material 304 or 604. The optimization could include the number of conventional support structures as a function of shell wall angle or curvature change ratio, cost optimization, and 3D object shell stability. Conventional supports could be introduced to be perpendicular to the support material layers or at an angle to the support material or the 3D object shell. Different types of conventional supports could be used in a combination with support material 304 or 604.

Use of large signage and in particular letters is a one of the applications that the present apparatus could simplify by reducing the amount of material used, reducing the manufacturing time and costs. FIG. 9 is a schematic illustration of stages of manufacture of a large 3D hollow object such as letter A according to the present method, although it is clear that any other letters or shells could be manufactured using apparatus 100 and the manufacturing method described above.

FIG. 9 is a schematic illustration of stages of manufacture of a large 3D hollow objects or shells, which in this particular case is a large size letter A. In FIG. 9A 3D hollow object material deposition head 104 deposits 3D hollow object material 904 on support 116 that optionally could include an interim member accepting the 3D hollow object material 904 and supporting easy removal of the manufactured object from the support 116. Arrow 908 shows that deposition of 3D hollow object material 804 is performed in vector mode and material deposition head 104 moves along the external 912 and internal 916 walls forming the letter A. 3D object material deposition head 104 continues to deposit layer by layer 3D hollow object material 904 until the flat walls 912 and 916 forming the letter "A" are reaching certain height or aspect ratio (FIG. 9B) of for example 1:50 or more. As explained above the aspect ratio depends on the material used, wall thickness and other parameters of the 3D hollow object or shell.

Figure 9A:
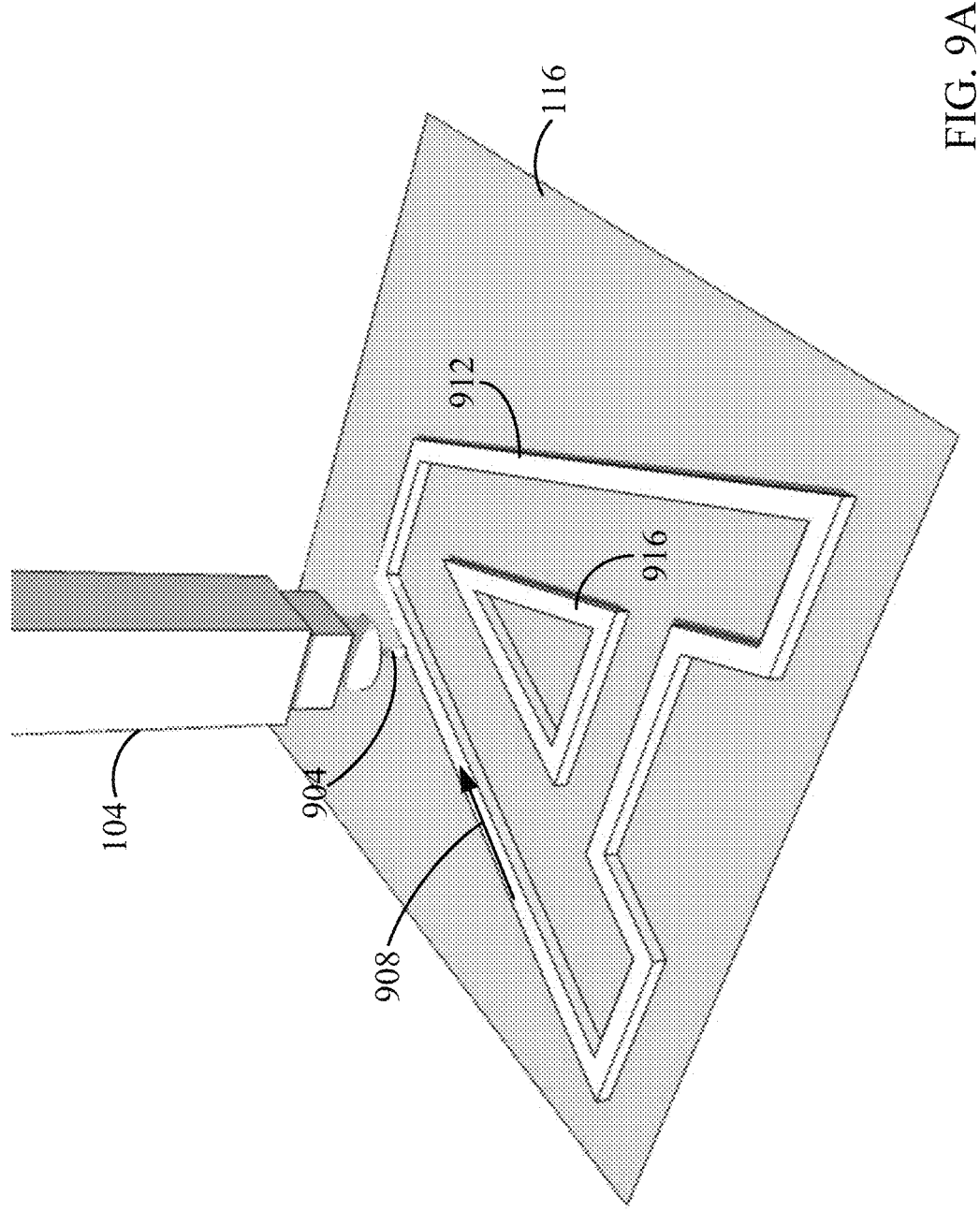
FIGS. 9A-9F are schematic illustrations of stages of manufacture of a large 3D hollow objects or shells, according to an example.
Figure 9B:
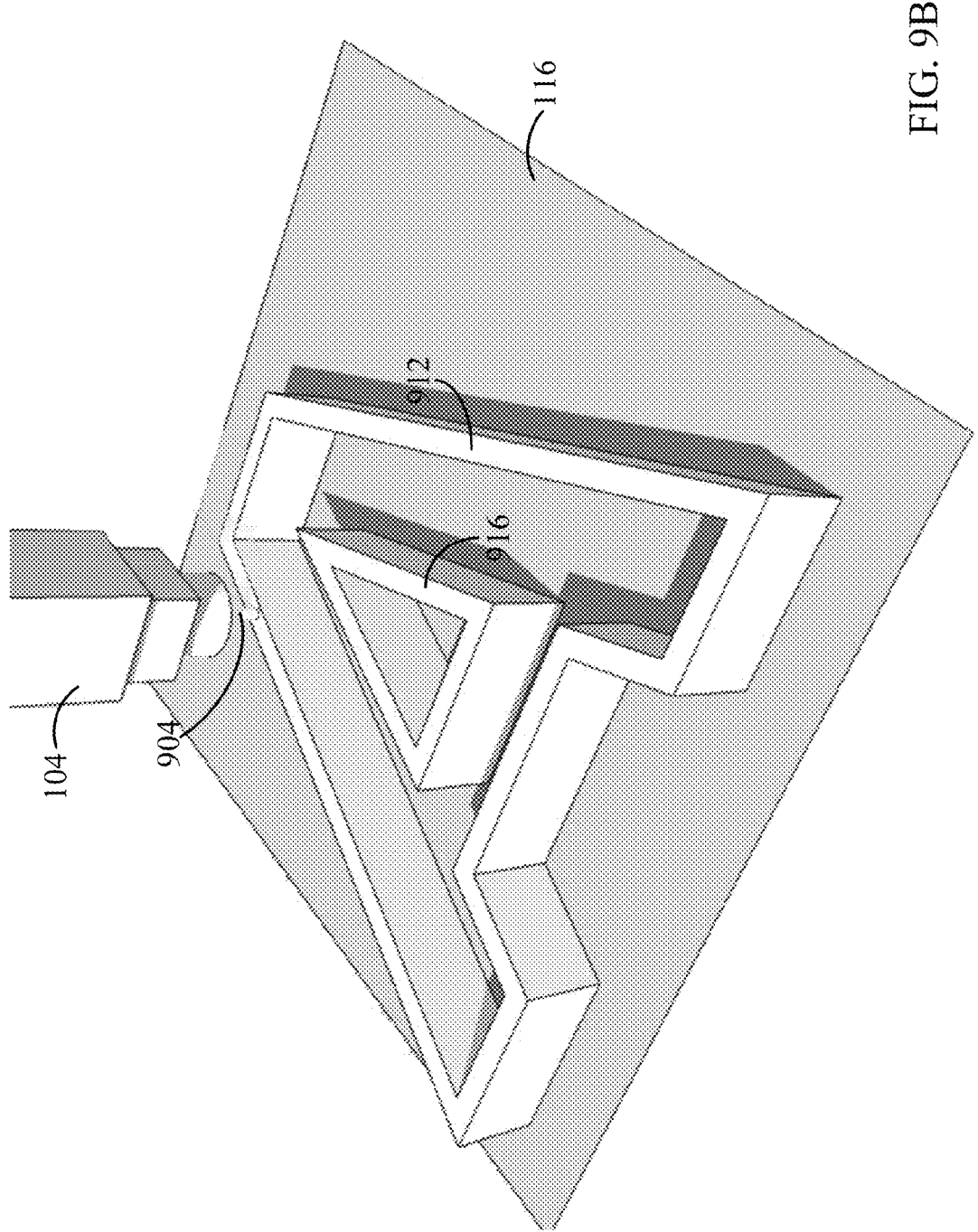
Figure 9C:
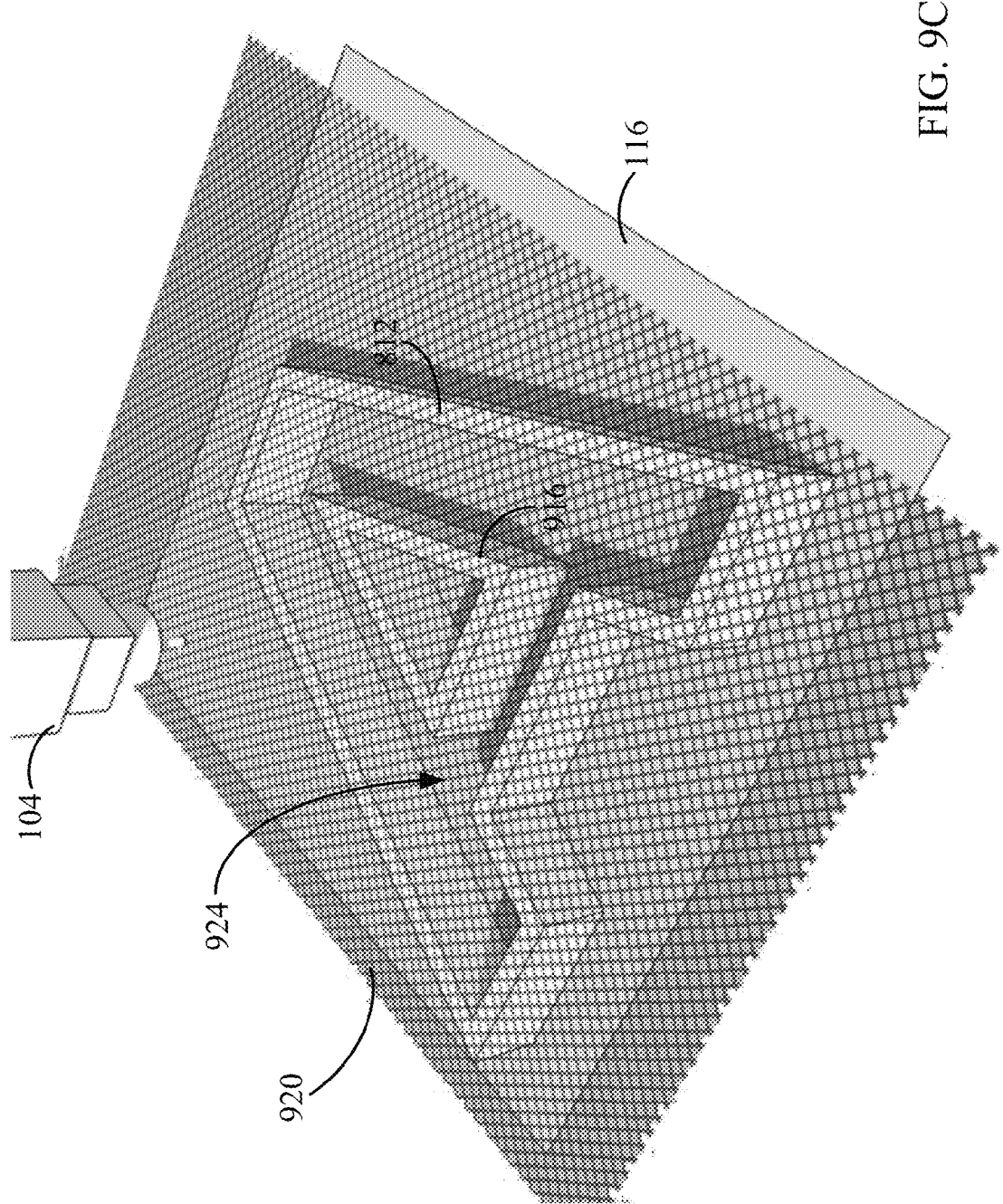

FIG. 9C illustrates next stage in manufacturing of letter A. Support material dispensing module 112 (FIG. 1) dispenses the support material 920, which is a plastic or metal grid, across a cross section of the letter "A" including the hollow or empty space 924 inside the letter A. Walls 916 of the inner part of the letter "A" could serve, and actually serve as a conventional support for support material 920. The process continues until the amount of material deposited forms the letter "A" of a desired size.

In order to simplify the explanation only one support material or grid dispensing step is shown, although depending on the 3D hollow object size there could be a relatively large number of support material dispensing stages.

Figure 9D:
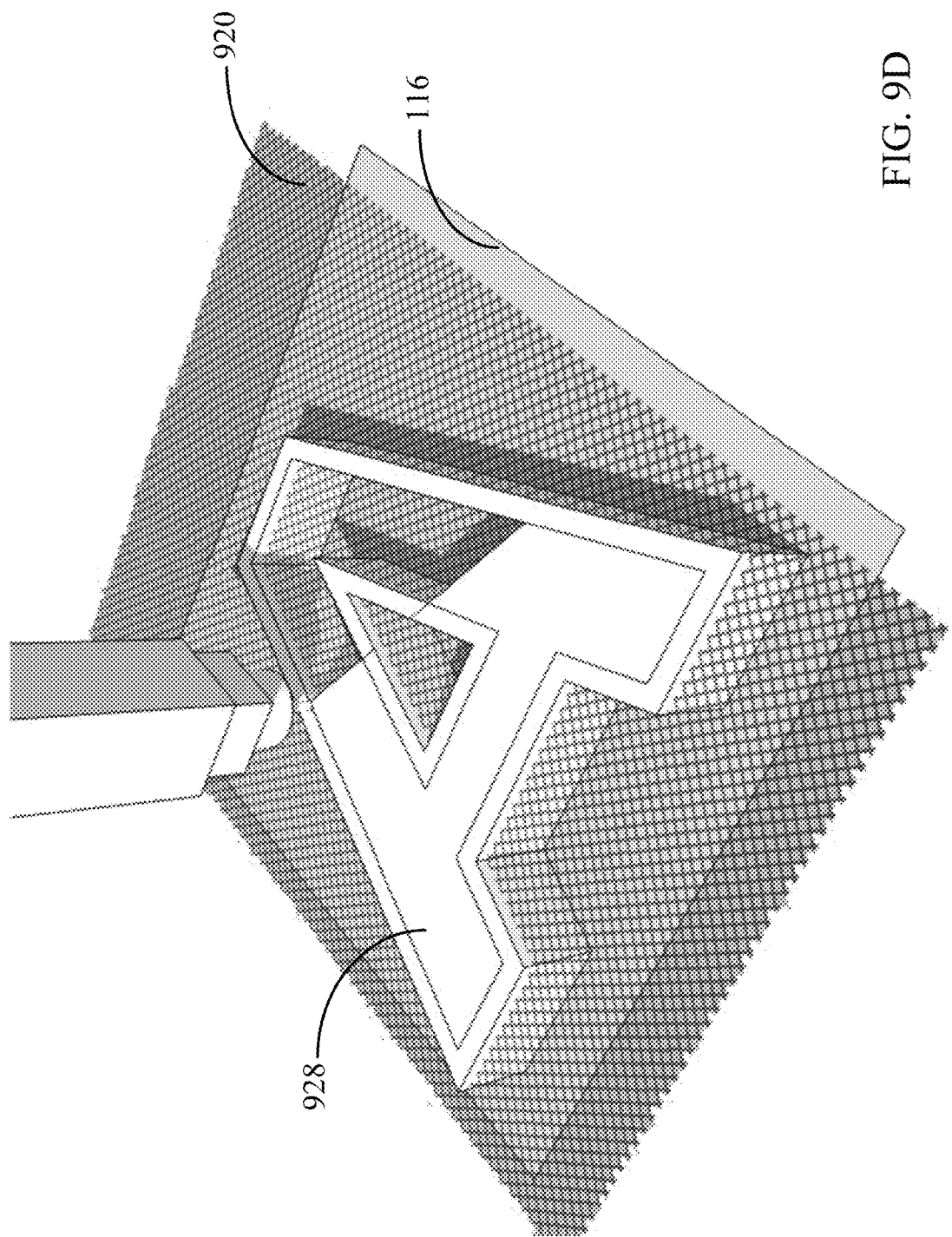

The mesh of the "last" layer of the support material could be selected to support safe deposition of 3D hollow object material 904 in liquid or gel form. In addition the level of the last or a number of support material layers stretching could be varied. FIG. 9D illustrates deposition of 3D hollow object material 904 over support material 920 to form the observable surface 928 of the letter "A".

Figure 9E:
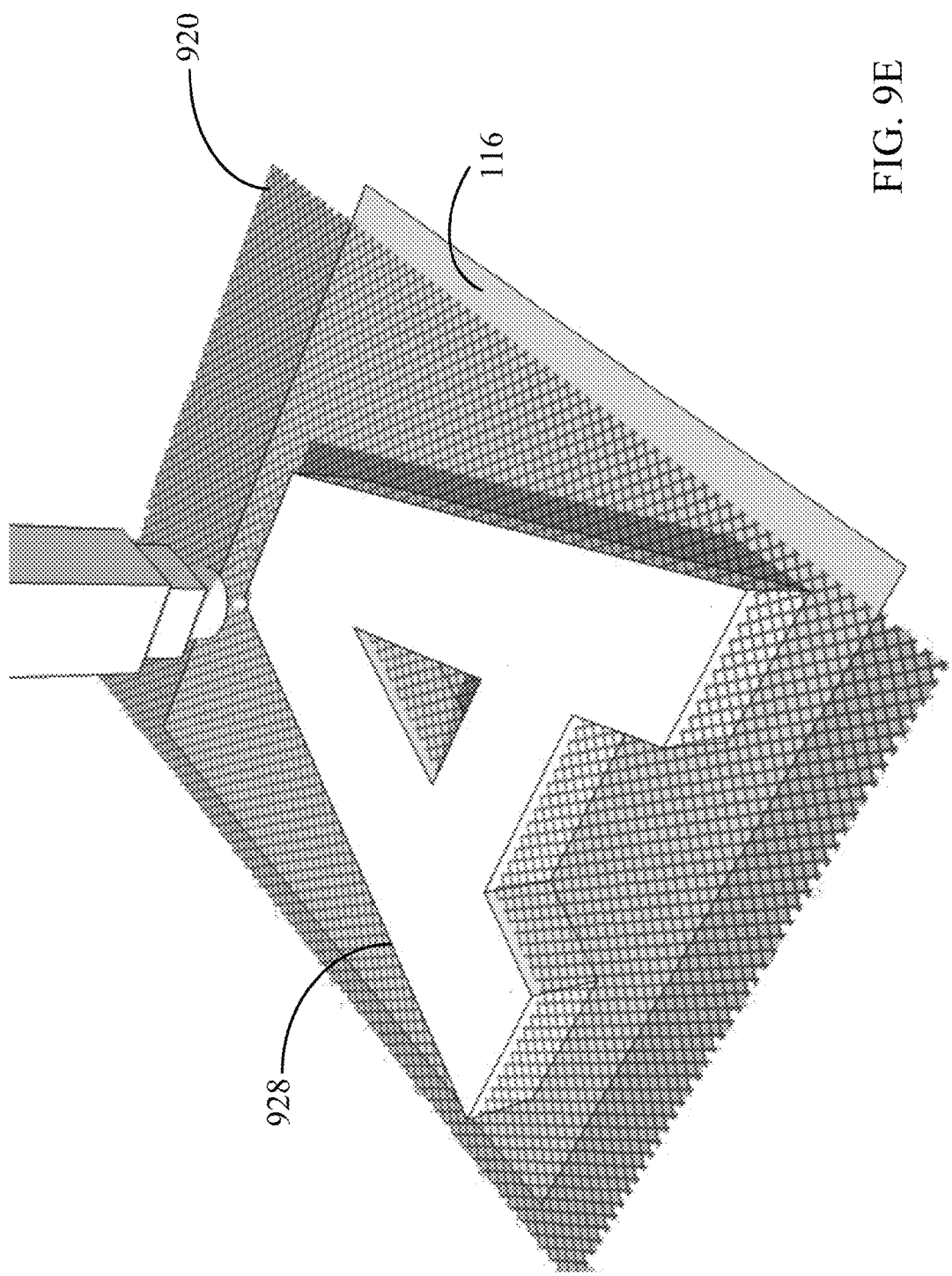

In FIG. 9E manufacture of the observable surface 928 of the letter "A" is accomplished and almost ready 3D letter "A" could be safely removed from support 116 of apparatus 100.

Figure 9F:
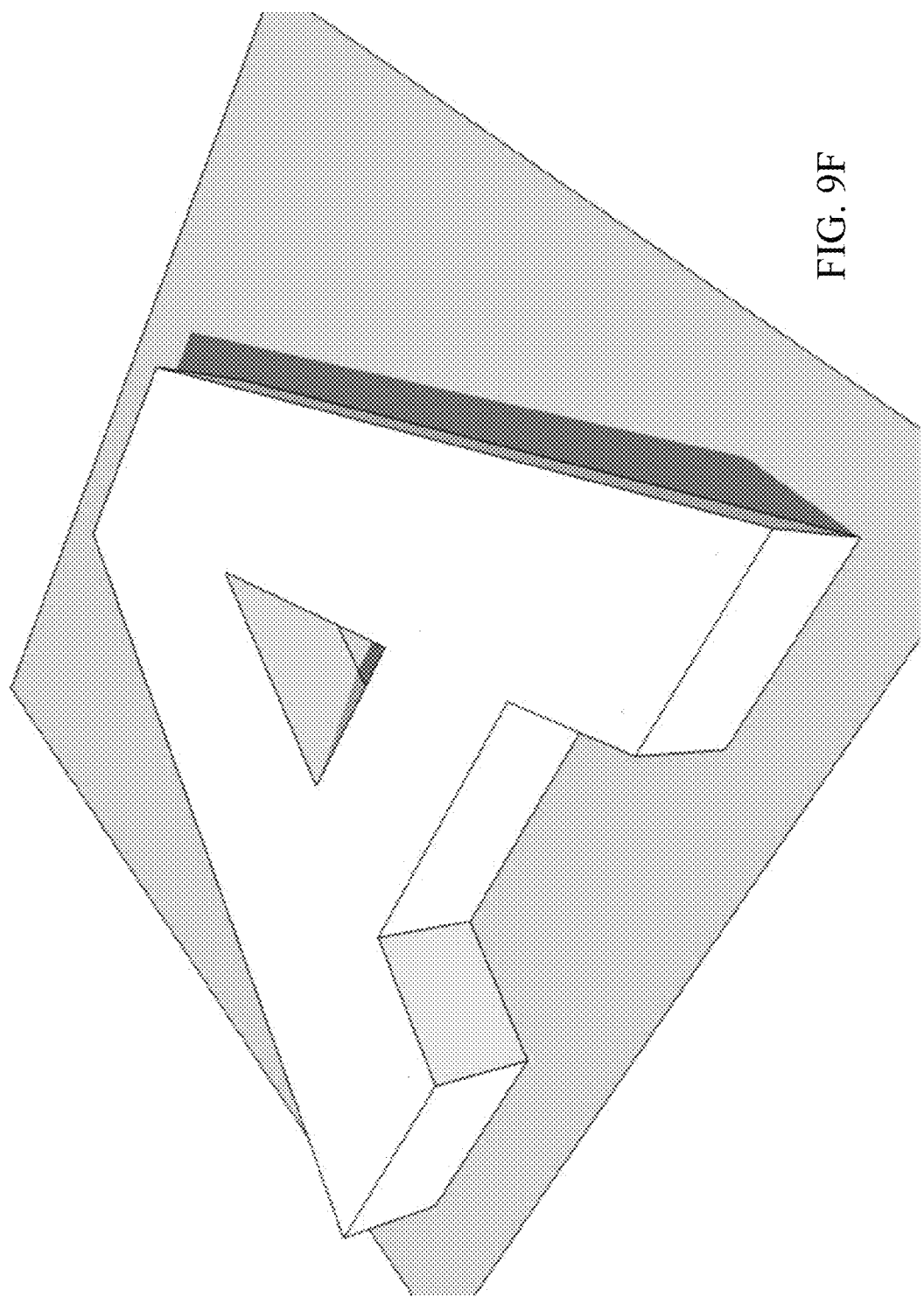

FIG. 9F illustrates a final stage in 3D hollow object (letter "A") manufacturing process. Upon completion of the 3D hollow object manufacture, the excessive support material 920 could be trimmed at least at the external surfaces of the object.

The apparatus and method described substantially reduce the time and cost of additive manufacture of the large 3D hollow objects. A combination of conventional supports with support material improves the strength of the 3D hollow objects and reduces their manufacturing cost.

What is claimed is:

1. An apparatus comprising:
a material deposition module configured to deposit a plurality of material layers to form a 3D hollow object to be manufactured, wherein each new layer is deposited on top or bottom of a previous layer;
a material solidifying module configured to solidify at least a portion of the material layer deposited and form at least a segment of the 3D hollow object to be manufactured; and
a support material dispensing module configured to dispense periodically the support material across a cross-section of a shell; and
wherein the support material dispensing module also stretches the support material across a cross-section of the shell.

2. The apparatus according to claim 1, wherein the material deposition module deposits the material through a plurality of material extrusion nozzles.

3. The apparatus according to claim 2, wherein the plurality of material extrusion nozzles are configured to support simultaneous manufacturing of different segments of the 3D hollow object.

4. The apparatus according to claim 2, wherein the plurality of material extrusion nozzles is also configured to deposit different materials and materials of different color.

5. The apparatus according to claim 1, wherein the support material dispensing module is configured to dispense at least one of a group of materials consisting of a metal grid, a plastic grid, a fabric grid, a grid made of material dissolvable in 3D physical object material, and a combination of all of the above.

6. The apparatus according to claim 1, wherein the material deposition module configured to deposit a plurality of material layers deposits material layers on top or bottom of each of a preceding layer and wherein the material layers are of different or identical shape.

7. The apparatus according to claim 1, wherein the 3D hollow object is located on a support table and wherein a solidification radiation source or a scanning laser beam is moved in X or Y direction.

8. The apparatus according to claim 1, wherein the material deposition module deposits a plurality of material layers in a plurality of colors.

9. A method for additive manufacturing comprising:
operating a large 3D hollow object with thin walls material deposition module to deposit a portion of material forming at least a layer of a large 3D hollow object with thin walls;
operating a large 3D hollow object with thin walls material solidifying module to solidify at least the portion of material deposited by the material deposition module and forming at least a layer of the large 3D hollow object with thin walls,
wherein the material deposition module deposits the material through a plurality of material extrusion nozzles; and wherein the plurality of material extrusion nozzles is also configured to deposit different materials and materials of different color; and wherein size of the large 3D hollow object with thin walls is at least 1000 mm by 1000 mm.

\* \* \* \* \*